United States Patent
Kobayashi

(10) Patent No.: US 6,358,595 B1
(45) Date of Patent: Mar. 19, 2002

(54) PORTABLE ELECTRICAL APPARATUS WITH METAL CASE HAVING THERMAL INSULATION

(75) Inventor: Takashi Kobayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 129 days.

(21) Appl. No.: 09/580,447

(22) Filed: May 30, 2000

Related U.S. Application Data

(62) Division of application No. 09/061,089, filed on Apr. 16, 1998, now Pat. No. 6,303,209.

(30) Foreign Application Priority Data

May 16, 1997 (JP) .............................. 9-126751
Dec. 25, 1997 (JP) .............................. 9-356607

(51) Int. Cl.⁷ ................................ H05K 7/20
(52) U.S. Cl. .................... 428/143; 428/141; 428/318.4; 428/304.1; 428/319.1; 428/21.7; 428/323; 428/158; 428/161; 428/457; 361/683; 361/687; 361/705; 361/707; 361/708; 361/714; 361/712; 361/713; 165/104.33; 165/185
(58) Field of Search ............................ 428/141, 318.4, 428/304.1, 319.1, 217, 143, 323, 158, 161, 457; 361/683, 687, 705, 707, 708, 714, 712, 713; 165/104.33, 185

(56) References Cited

U.S. PATENT DOCUMENTS

| | | | |
|---|---|---|---|
| 4,694,119 A | 9/1987 | Groenewegen | 174/52 PE |
| 5,258,888 A * | 11/1993 | Korinsky | 361/690 |
| 5,263,773 A | 11/1993 | Gable et al. | 312/406 |
| 5,401,348 A | 3/1995 | Oguchi et al. | 156/247 |
| 5,774,333 A * | 6/1998 | Janik et al. | 361/687 |
| 5,847,925 A * | 12/1998 | Progl et al. | 165/104.33 |
| 5,991,155 A * | 11/1999 | Kobayashi et al. | 165/80.2 |
| 6,055,156 A * | 4/2000 | von Gutfeld | 361/690 |
| 6,073,684 A * | 6/2000 | Fiechter et al. | 165/104.33 |
| 6,304,459 B1 * | 10/2001 | Toyosato et al. | 312/208.4 |

FOREIGN PATENT DOCUMENTS

| | | |
|---|---|---|
| JP | 58-70865 | 4/1958 |
| JP | 51-10652 | 3/1976 |
| JP | 60-19228 | 6/1985 |
| JP | 62-39674 | 2/1987 |
| JP | 63-319085 | 12/1988 |
| JP | 64-11599 | 1/1989 |
| JP | 2-303573 | 12/1990 |
| JP | 4-210012 | 7/1992 |
| JP | 4-319433 | 11/1992 |
| JP | 6-7599 | 1/1994 |
| JP | 6-26659 | 2/1994 |
| JP | 6-296655 | 10/1994 |
| JP | 7-32894 | 4/1995 |
| JP | 7-256821 | 10/1995 |
| JP | 7-326868 | 12/1995 |
| JP | 8-10141 | 1/1996 |
| JP | 8-74450 | 3/1996 |
| JP | 8-290509 | 11/1996 |
| JP | 8-323931 | 12/1996 |
| JP | 9-57907 | 3/1997 |

* cited by examiner

*Primary Examiner*—William P. Watkins, III
(74) *Attorney, Agent, or Firm*—Leydig, Voit, & Mayer, Ltd.

(57) ABSTRACT

The object of the invention is to produce a surface layer that can prevent from uncomfortable sensation upon manual handling of component such as metal chassis used in electronic devices. The surface is coated with a special paint material or a resinous coating material that include insulating material or foamed structure. For example, gaseous entrapments are incorporated in the layer by pre-mixing a foaming material in the paint, followed by foaming the layer at a high temperature. A decline in the restoring strength of the foaming material is supplemented by the top coating with the bead-containing paint.

7 Claims, 11 Drawing Sheets

Fig.15

| SAMPLES | BASE MATERIAL (THICKNESS) | SURFACE COATING (THICKNESS) |
|---|---|---|
| SAMPLE A | Al (0.3mm) | EPOXY RESINOUS PAINT COAT (0.03mm) |
| SAMPLE B | Al (0.3mm) | FOAMED PAINT (0.2mm) |
| SAMPLE C | ABS (0.1mm) | EPOXY RESINOUS PAINT COAT (0.03mm) |

Fig.16

| PATTERN | ORDER OF TOUCHING WARMTH | VOTES (%) |
|---|---|---|
| 1 | A>>B>C | 3(33.3%) |
| 2 | A>>C>B | 3(33.3%) |
| 3 | A>>B=C | 3(33.3%) |

PORTABLE ELECTRICAL APPARATUS WITH METAL CASE HAVING THERMAL INSULATION

This application is a divisional of Ser. No. 09/061,089, filed Apr. 16, 1998 now U.S. Pat. No. 6,303,209.

BACKGROUND OF THE INVENTION

1. Field of the Invention

The invention relates to surf ace processing of a component subjected to direct handling by people, mainly relating to a special coating applied on a surface of a metal chassis used in mobile electronic devices, whereby the temperatures the chassis sensed by touching the chassis is reduced.

In the specification, examples of the surface processing of a component (hereinafter surface coated substrate), particularly a metal chassis used in electronic devices are described. However, the surface coated substrate according to the invention has wide-ranging applications, such as in ranges, metallic protection of cooking utensils, materials used for walls and ceilings in boildings, and other general purposes requiring a surface coated substrate with reduced temperature sensed by touching. The surface coated substrate does not have to be metallic. A material according to the invent ion is equally effective as surface coated substrate if its thermal conductivity is large. Further, the material is effective in substrates subjected to high-temperature and also for low-temperature.

2. Background Arts

Examples using electronic devices are explained in the related arts.

Methods of dealing with heat and high temperature at the surface of a chassis has become an important topic in view of a recent move towards light-weight, (thinner) and densely-coated chassis in mobile devices such as mobile personal computers, mobile telephones, mobile video cameras, electronic notebooks, and the cooling of semiconductor element as well.

Conventionally, a chassis made of a resinous material, such as ABS (acrylonitrile-butadiene styrene copolymer) is used in mobile devices. However, increasingly, metal chassis are being used in an attempt to strengthen the ever thinner chassis and to improve shock resistance. However, a metal chassis cannot handle a surface temperature above 50° C., because that temperature can cause an unpleasant feeling if held in the hand for a prolonged period of time. Therefore, mobile devices require heat control. The reason for the problem is that, when touched, a material with low thermal conductivity, such as conventional ABS (thermal conductivity $\lambda$=0.1 W/mK), due to a loss of heat upon contact to the side of lower temperature, the material is cooler than the hand. Therefore, people will not sense a temperature to be hot. On the other hand, using a material with high thermal conductivity, such as aluminum (thermal conductivity $\lambda$=220 W/mK), causes a continuous heat flow from the material to the hand that this leads to an uncomfortable sensation, sometimes even to unpleasant feeling. A conventional method which has dealt with the problem is described below.

For example, in the related art 1 shown in FIG. 10, a metal chassis 1 that became hot due to the heat generated from a heating element, such as heating device 3 mounted on a base 2 has attached to it a cloth, like a felt 4, that has a low thermal conductivity to reduce direct heat flow to a hand. As a general example of such product, see Japanese unexamined patent application hei6-296655. There are high temperature areas in sauna interior and the periphery of thermal head in a printer which also use measures to prevent unpleasant feeling.

Besides using a cloth, an insulating material can similarly be attached, and, according to Japanese patent application hei6-26659, the insulating material made of rubber may be used as a handle of grill door, and. Japanese patent application hei4-210012 shows an example of attaching a protection sheet made of rubber to a power-supplied heating plate.

For a door handle used in building, Japanese unexamined patent application hei8-74450, provides an example of attaching a mesh material in an attempt to reduce the touching warmth when opening and closing the door in regions of extreme cold and intense heat.

Other than the given examples, for the related art 2 shown in FIG. 11, adhering a transplanting pile 5 to a high-temperature surface of a metal chassis 1 is done generally, and as an applied example of such a product, an iron and heating device are disclosed in the Japanese unexamined patent application hei6-7599.

The related art 3 of FIG. 12 shows a general use of a paint 6 applied to a surface of the metal chassis 1 that can become high in temperature at the surface.

The related art 4 discloses a technique to deal with the high temperature by using a paint with mixed micro-capsules that are thermally expandable. The thermally expandable micro-capsules are foamed by heating them.

For example, Japanese unexamined patent application hei6-99133 discloses a method of forming a film with a grain-like touch. In this method, a thermosetting paint contains 5~30 weight % of the thermally expandable micro-capsules in a paint having 70% of solid ingredient and painted to get the grain-like texture. The shell of the thermally expandable micro-capsules soften at a temperature lower than a hardening temperature of a thermosetting resin. A coating step using thermosetting paint is done in a manner to get the grain-like texture, and this is dried by baking. During baking, the micro-capsules become ruptured from expansion. Accordingly, the film painted will harden to achieve the grain-like texture.

Further, Japanese unexamined patent application sho62-39674 discloses a method of forming an insulating film with pattern. Paint compositions such as a pigment, a filler and a solvent are contained in a thermal plastic resinous vehicle. 10~80 weight % of the micro-capsules are contained in 100 weight % of the thermal plastic resinous vehicle. This paint is applied to surfaces of wall, ceiling and floor. Then the heating apparatus is used to heat the applied surfaces for drying to gain an expansion of the painted film. Accordingly, the insulating film with heated pattern is formed.

Furthermore, according to Japanese unexamined patent application hei2-303573, a method of forming the film having a rough pattern is disclosed. The thermally expandable micro-capsules are dispersed in the paint. The paint becomes hardened at a temperature lower than a foaming temperature of the thermally expandable micro-capsules. The paint may be applied all over or part of the surfaces, then hardened by heat. Then a final paint is applied on top of this layer, then hardened. The rough pattern is achieved by heating the micro-capsules beyond the foaming temperature.

In recent years, particularly for mobile electronic devices represented in the mobile computing, a technique to implement a product with small-size, high-performance and light-weight are the key points. From such background, in mobile computing, a use of metallic substrate formed by die-casting is on an increase, from its excellence in terms of strength against weight. Comparing the metallic substrate with the conventional resinous substrate, the thermal conductivity is 100~1000 times greater than that of the metallic substrate. Therefore, the metallic substrate is advantageous for spreading heat.

However, when a person touches the surface of the metallic substrate, a person perceives it to be hotter than a resinous substrate at the same temperature, due to a heat collection effect of metallic substrate. Especially for the mobile computers these days, a way to deal with high temperature of the substrate surface is important; especially a way to deal with locally increased temperature such as the surface close to the CPU (Central Processing Unit) is important.

As described previously, as the method to soften the touching warmth, adhering transplanting piles 5 to a high-temperature surface of a metal chassis 1 is done generally, and as applied examples of such products are the heating device and the thermal head chassis of printer. However, there is a problem with the design/appearance when applying the method of transplanting piles to the electronic device chassis. Likewise, other means to deal with the high temperature is a pasting of resinous sheet, however, this method has even more problems with surface applicability, productivity and design/appearance.

Previously described conventional methods in the related arts 1 and 2 are effective as far as the touching warmth is concerned. However, problem with the method of attaching a rubber or a mesh material to electronic devices that have complex curvatures at the chassis surfaces is its difficulty in fitting them into the given shapes. Likewise, there is a problem with the transplanting method where a difficulty arises in uniformly adhering the fibers to a structurally complex portion of the device. There is also a concern about the limitation on the allowed size and shape of the chassis. Even if this fitting is done satisfactorily, a concern for abrasion or staining remains so that there is no ideal method for the product. The same can be said from the viewpoint of productivity because the manufacturing cost will increase.

In comparing the previously described means with a general coating method for a surface of metal chassis as shown in the related art 3 of FIG. 12, the coating method is reasonable in terms of productivity, design, and cost. However, with the normal coating, the thickness of applied paint (film) is normally about 40 $\mu$m that the touching warmth from metallic substrate is not softened. The reduction of touching warmth cannot be expected from the normal coating method.

The related art 4 describes a technique of forming the grain-like touch or the rough pattern that are formed by using the paint containing the thermally expandable microcapsules and a technique of forming a pattern having a thermal insulating property. Neither of the techniques are aiming for a way to deal with the touching warmth, nor to soften the touching warmth from the metallic substrate.

SUMMARY OF THE INVENTION

To solve the problems as described previously, the present invention attempts to implement a method to deal with the touching warmth, by devising the surface processing method based on the coating method, maintaining advantages such as designs, surface applicability, productivity and low manufacturing cost.

Particularly, the present invention aims to soften the touching warmth at the surface of metallic mobile electronic devices, improve design/appearance of the product, and supply coating that is resistant to abrasions.

The concepts of "insulating heat" and "softening the touching warmth" according to the present invention are two different concepts. What is meant by "insulating heat" is to isolate the heat and the heat is not transmitted. For example, consider a case when the heat is generated inside the mobile electronic device. In this regard, the meaning of "insulating heat" is to shut the heat being generated in the mobile electronic device and this will result in a damage of the device. On the other hand, the meaning of "softening the touching warmth" is to reduce the heat flow to hand. When the heat being generated from inside the device spreads to outside of the substrate surface, an amount of heat flow to hand has to be reduced. That is, the technique of "softening the touching warmth" for the present invention must satisfy the following two contradicting requirements, namely: spreading the heat generated inside the mobile electronic device through the substrate surface; and removing an unpleasant sensation perceived by the human body from the spreading heat. Thus, the present invention aims to provide a coating technique to ease the heat influence on the human body as well as maintaining the heat spreading property.

According to one aspect of the present invention, a surface coated substrate comprises a metallic substrate having a surface and a film including a layer for reducing a touching warmth, wherein the film is coated on the surface.

According to an another aspect of the present invention, the film comprises a foamed layer made of a paint material which includes a foaming material.

According to an another aspect of the present invention, the film is further comprising a top coating layer on top of the foamed layer, wherein the top coating layer is having a high degree of hardness than the foamed layer.

According to an another aspect of the present invention, the top coating layer is made of a bead-containing paint.

According to an another aspect of the present invention, the paint material is a paint or a resinous coating material.

According to an another aspect of the present invention, the metallic substrate is made of one of an aluminum, a magnesium and an aluminum alloy and a magnesium alloy.

According to an another aspect of the present invention, the foamed layer is 50~100 $\mu$m thick.

According to an another aspect of the present invention, the metallic substrate is formed using a die-casting. The layer for reducing the touching warmth is used in concealing and filling a dent and a wrinkle formed during the die-casting of the metallic substrate.

According to an another aspect of the present invention, the layer for reducing the touching warmth includes an insulating filler material.

According to an another aspect of the present invention, the layer for reducing the touching warmth includes a granulated insulating material.

According to an another aspect of the present invention, the film has a rough surface.

According to an another aspect of the present invention, a method for reducing the touching warmth by coating a surface of the metallic substrate is comprising steps of: painting the surface of metallic substrate using the paint material including the foaming material; and forming the foamed layer by drying the paint material with heat for foaming the foaming material.

According to an another aspect of the present invention, the method is further comprising a step of forming the top coating layer, which has a high degree of hardness than the foamed layer, on top of the foamed layer.

According to an another aspect of the invention, the step of forming the top coating layer includes a step of painting the top coating layer using the bead-containing paint.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention, and wherein:

FIG. 15 illustrates experimental samples of the invention;

FIG. 16 illustrates the result of experimental study of the invention; and

DETAILED DESCRIPTION OF THE PREFERRED EMBODIMENTS

Figure 1:
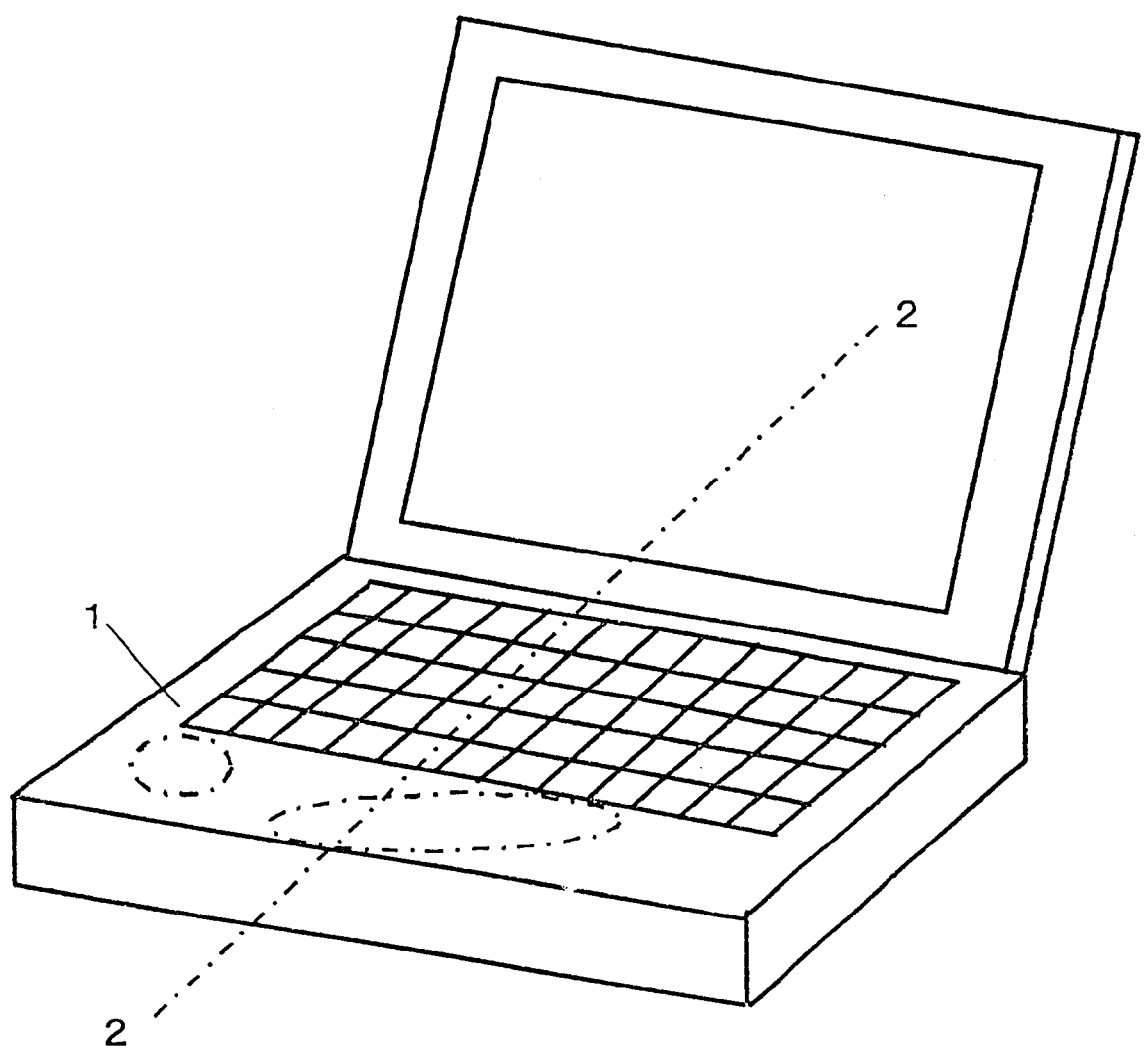
FIG. 1 is a side view of embodiment 1 of the invention.

Reference will now be made in detail to the present preferred embodiments of the invention, examples of which are illustrated in the accompanying drawings, wherein like reference numerals indicate like elements throughout the several views.

Improvement in the paint is desirable as the way to deal with the design/appearance, the productivity and the low manufacturing cost required for the electronic device chassis. Trial tests are done for the coating method, using trial guides 1 to 3 described below.

1. Improving the Insulation of Film Coating

When the two half infinite solids with different temperatures come into contact with one another, it is known that an intermediate temperature at the point of contact, $T_m$, is calculated using the equation (1). That is, when a hand is considered to be one of the half infinite solids, then when the hand touches a material with a small value of $\beta_2$, the temperature $T_m$ will not be affected by the temperature of an another one of the half infinite solids. Using this principle, "improving a physical property of the film coating (i.e. improvement in the insulation property)" is examined as the trial guide 1.

The "improvement in the insulation property" does not have same meaning as "insulating heat". What is meant by the "improvement in the insulating property" herein is to decrease the amount of heat flow from the film coating to the hand.

$$T_m=(\beta_1 T_1+\beta_2 T_2)/(\beta_1+\beta_2) \quad (1)$$

$$\beta_1=\lambda_1/\sqrt{\alpha_1}$$

$$\beta_2=\lambda_2/\sqrt{\alpha_2} \quad (2)$$

whereas $\alpha_1$: thermal diffusivity of human body (m²/S)

$\beta_1$: thermal penetration rate of human body (W($\sqrt{S}$)/(m²K))

$\alpha_2$: thermal diffusivity of touching object (m²/S)

$\beta_2$: thermal penetration rate of touching object (W(°$\sqrt{S}$)/(m²K))

$\lambda_1$: thermal conductivity of human body (W/(mK))

$\lambda_2$: thermal conductivity of touching object (W/(mK))

$T_1$: temperature of human body (K)

$T_2$: temperature of touching object (K)

2. Increasing Thickness of the Film Coating

An overall heat transfer rate of the film is calculated using the equation (3). Besides the improvement in the physical property mentioned in the trial guide 1, the heat flux to the hand is controlled by increasing the thickness of the film. The effect of thickening the film is examined as the trial guide 2.

$$U=\lambda/d \quad (3)$$

U: overall heat transfer rate in film (W/m²K)

d: thickness of film (m)

3. Increasing Roughness at a Surface of the Film Coating

A method of making the rough surface is examined as the trial guide 3, for reducing a contact area of a surface with a finger. By doing so, thermal resistance is increased at the film surface, therefore, it is expected that an amount of heat transmission to a hand is reduced.

Following embodiments describe a variety of coating examples based on the trial guides 1 to 3 mentioned above.

Embodiment 1.

FIG. 1 illustrates an embodiment including the surface coated substrate prepared by the surface processing method of the present invention in dealing with the touching warmth.

Note that a part indicated by the elliptical outline in FIG. 1 on the surface coated substrate is subjected to a high-temperature from a heating device 3 situated immediately below the outline.

Figure 2:
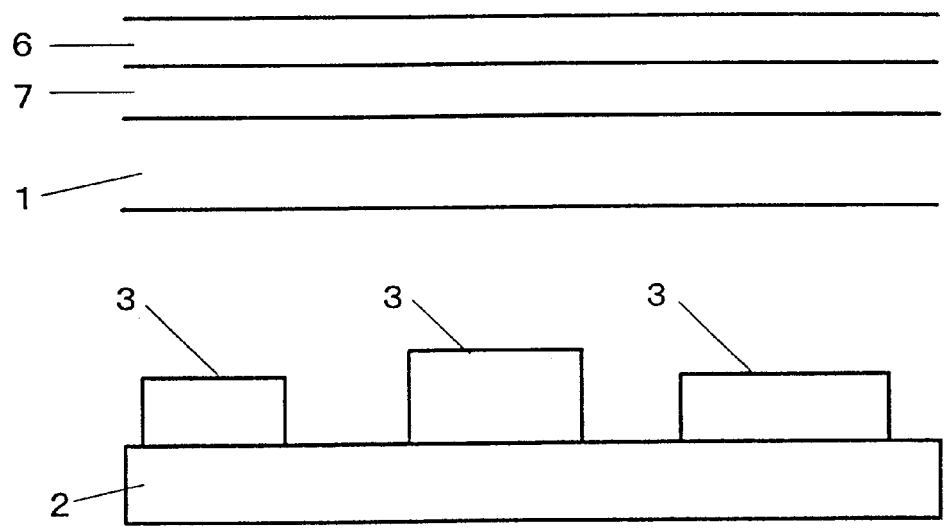
FIG. 2 is a cross-sectional view of embodiment 1 of the invention.

FIG. 2 is a side view of the surface coated substrate showing cross-section cut through 2—2 of FIG. 1.

As a metal chassis 1, for example, pure magnesium or a magnesium alloy is used. Or, pure aluminum or an aluminum alloy may also be used. Alternatively, other light metals with a density less than 4.0 g/cm$^3$ or 5.0 g/cm$^3$ may be used.

Generally, it is difficult to apply a thick coating, therefore, a resinous coating material 7 is applied first to form a base to increase a thickness of thermally insulating coating, so as to increase a thickness of the surface processed layers, and this will reduce the touching warmth at the surface. For use as the base material, vinyl chloride resin is suitable, where a thickness greater than 100 microns has proved to be effective as the base material. In the present embodiment, different types of paint materials (paint 6 and resinous coating material 7) are arranged to form a multi-layered films to increase the thickness of surface processed layers, thereby improving the touching warmth property. The following macromolecular compounds (polymers) are examples that can be applied other than vinyl chloride resin: acrylic resin, fluorocarbon polymers, vinyl resin, phenol resin, polyester, epoxy resin, polyethylene, rubber, urea resin, meramine resin, polyurethane, silicone resin, and polyamide. These polymers can either be used alone or in combination.

Embodiment 2.

Figure 3:
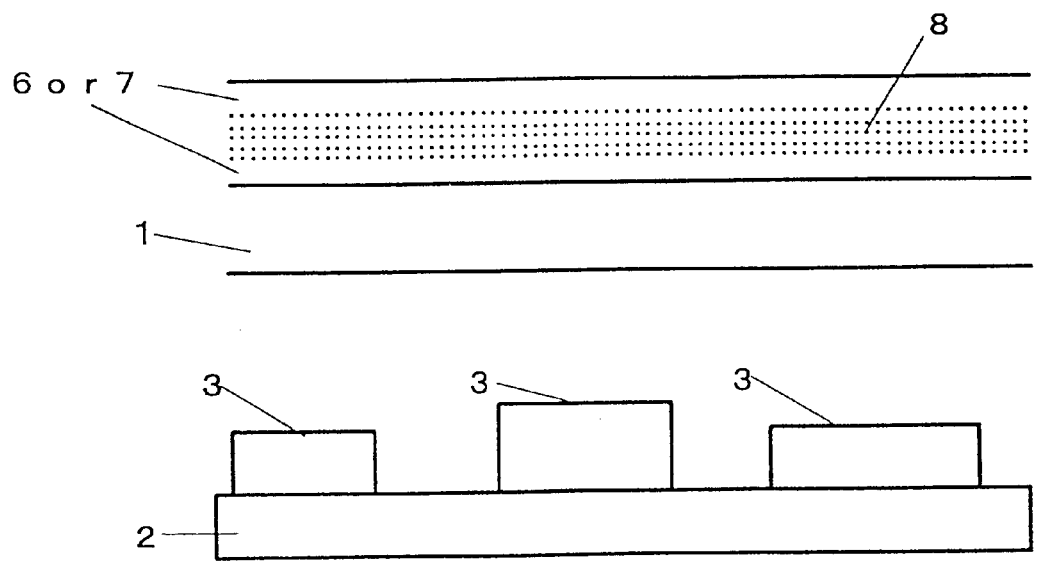
FIG. 3 is a cross-sectional view of embodiment 2 of the invention.

FIG. 3 is the cross-section for a case of incorporating the thermally insulating layer, prepared by applying a paint made from mixing a fibrous insulating filler material 8 with the paint 6. The touching warmth is reduced by using the paint made from the mixing of insulating filler material 8 with the paint 6 because it lowers the thermal conductivity of the film layer.

Specific examples of the insulating filler materials 8 are materials with a low value of thermal conductivity and effective insulation, such as mica or pearlite. Other than mica or pearlite, inorganic particles such as diatomaceous earth (SiO$_2$+H$_2$O), alumina powder (Al$_2$O$_3$+nH$_2$O), calcium carbonate (CaCO$_3$), and titanium oxide (TiO$_3$) can be used. Fibrous materials of cattle leather and mixed leathers can also be used. The insulating filler material 8 also acts as a weight increaser, thereby increasing the thickness of film layer. The paint can also be made from mixing the insulating filler material 8 with the resinous coating material 7.

Embodiment 3.

Figure 4:
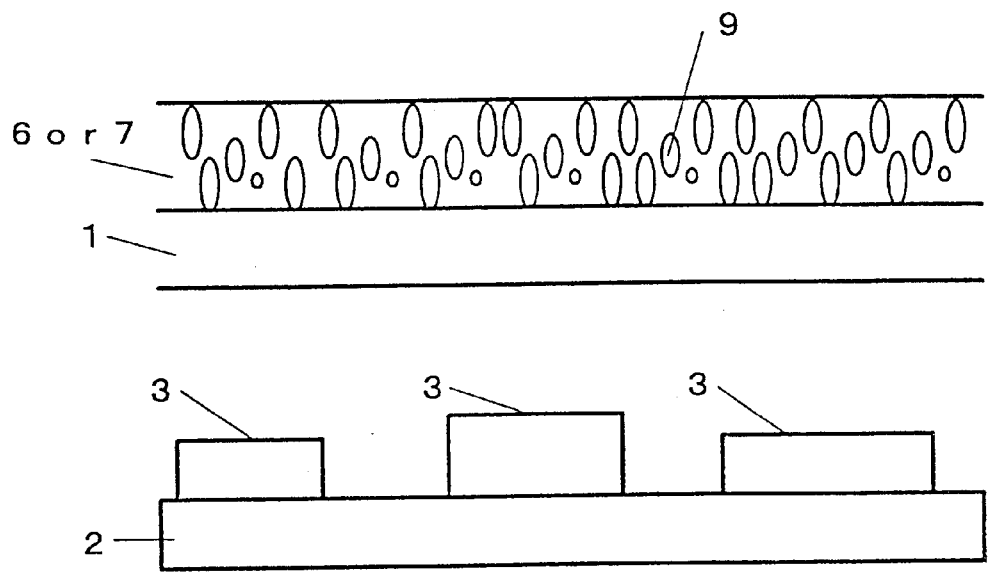
FIG. 4 is a cross-sectional view of embodiment 3 of the invention.

FIG. 4 is the cross-section of an embodiment of the surface coated substrate that incorporates a plurality of granulated insulating materials 9 in the film layer.

The specific examples of the granulated insulating materials 9 are materials with a low value of thermal conductivity and effective insulation, such as cork powder or hollow beads to make gaseous entrapments, for example, air entrapments and hydrocarbon entrapments, inside the film. The thermal conductivity of the film layer will be effectively lowered to reduce the touching warmth. The granulated insulating materials can also become a weight increaser, therefore, it is possible to increase the thickness of film layer. The granulated insulating material 9 can also be mixed with the resinous coating material 7. Other than the hollow beads, following can be used: carbon balloon, acrylic and styrene, silicate mineral, silica-alumina fiber, and glass. The hollow beads and other materials such as carbon balloons can either be used alone or in combination.

Embodiment 4.

Figure 5:
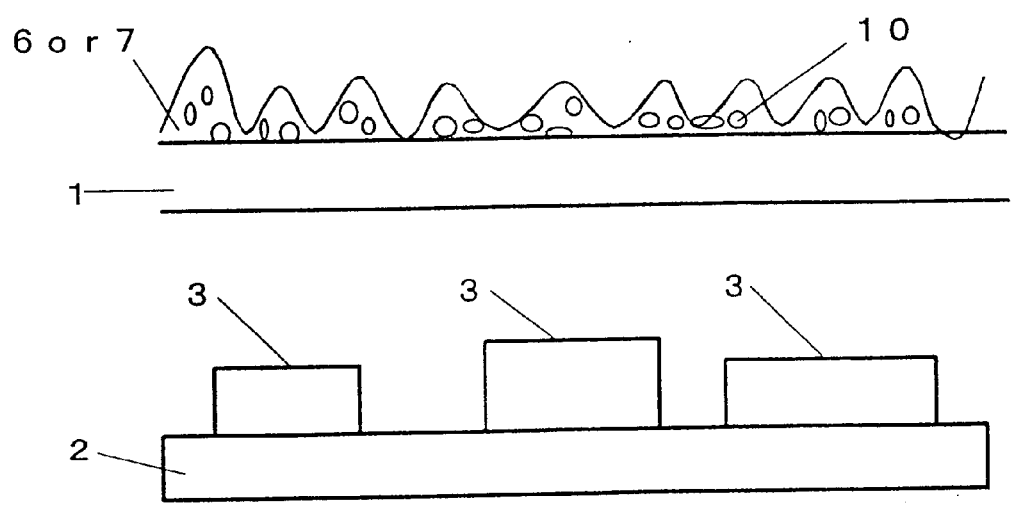
FIG. 5 is a cross-sectional view of embodiment 4 of the invention.

FIG. 5 is the cross-section of a surface processed substrate that includes gaseous entrapments by pre-mixing a foaming material 10 with the paint, followed by foaming the mixed material at a high temperature.

A specific example of the foaming material 10, the thermally expandable micro-capsules such as hydrocarbons having a low boiling point are mixed in a normal paint. By heating and foaming the mixed materials, a porous structure is formed in the painted film, thereby reducing the thermal conductivity of the film layer and reducing the touching warmth. The foaming material can also increase the weight and thickness of the film layer. The foaming material 10 can also be mixed with the resinous coating material 7.

Here are some examples of the foaming material 10: foaming glass, foaming concrete, foaming urethane, foaming styrene, foaming polypropylene, and foaming PET (polyethylene terephthalate) can either be used alone or in combination.

Instead of the foaming material 10 the following materials may be included in the paint 6 or resinous coating material 7: alumina powder (Al$_2$O$_3$+nH$_2$O), calcium carbonate (CaCO$_3$), and titanium oxide (TiO$_3$), silicate mineral, glass, acrylic and styrene beads. These materials will become a spacer to form gaseous entrapments. When painting the paint 6 and resinous coating material 7, the gaseous entrapments can be formed at the sides of the spacer. In addition, as foaming material 10, monomers having a vapor pressure different from the paint 6 or the resinous coating material 7 can either be used alone or in combination. The gaseous entrapments are formed by volatilization of the monomers at the time of painting.

Figure 6:
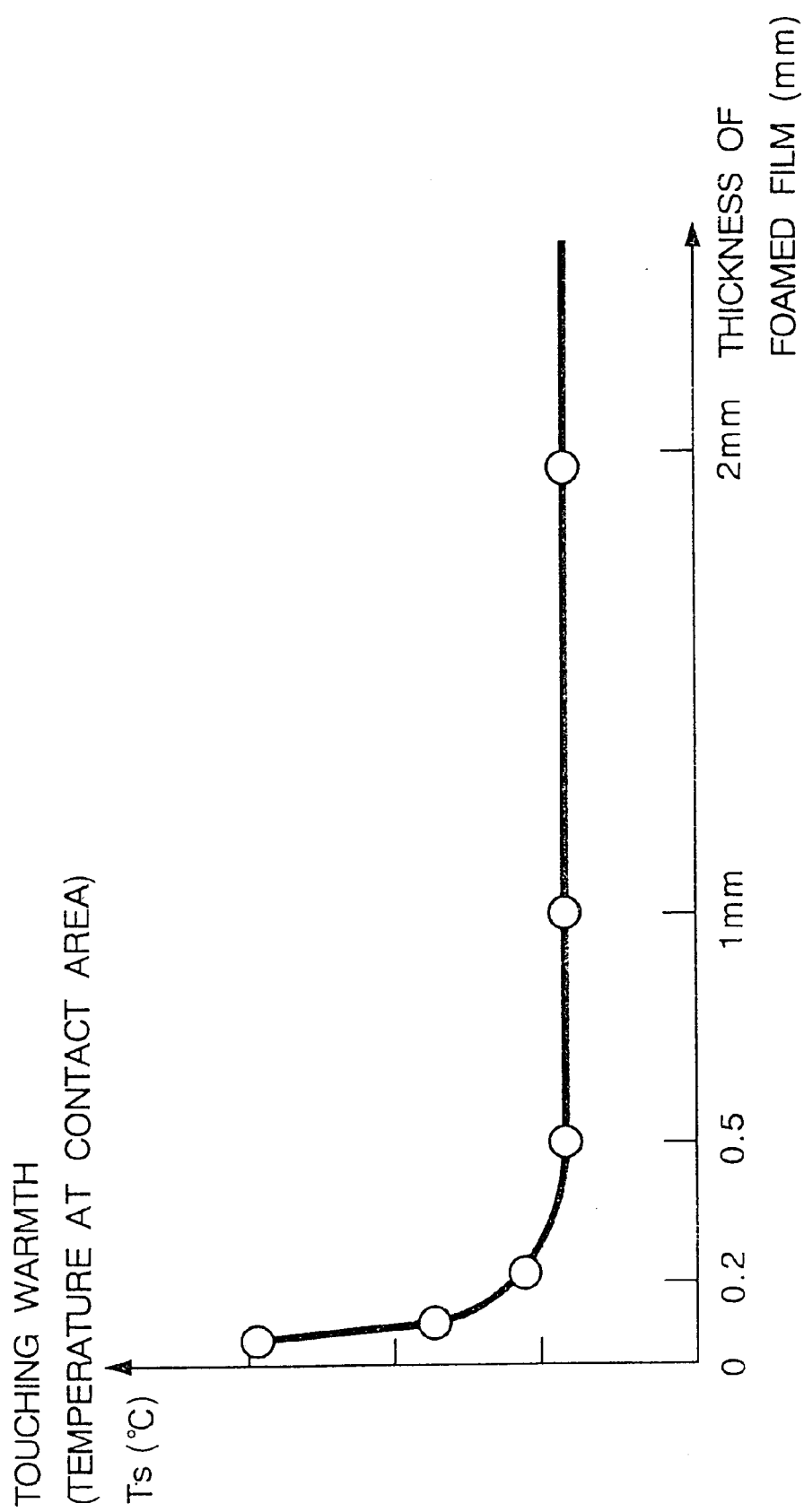
FIG. 6 is a graph showing a relationship of the thickness of the film layer and touching warmth according to the embodiment 4 of the invention.

An example that shows relationship between the thickness of the foamed film layer and touching warmth, $T_s$, which controls the sensations perceived by people who have touched a particular high-temperature metallic surface, is shown in FIG. 6. If the film layer is thicker than 50 $\mu$m, the touching warmth shows a prominent reduction, and, for the thickness of more than 300 $\mu$m or more than 1000 $\mu$m, the touching warmth is constant regardless of film layer thickness. Thus, in practice, the thickness ranging from 50 to 1000 $\mu$m is found to be most effective.

An effect of the present invention is calculated for evaluation using the heat transfer rate U as an index.

As described previously, the meaning of "softening the touching warmth" is to reduce the amount of heat flow from the mobile electronic device to hand and fingers in contact. A model illustration of FIG. 17 shows a state of heat flow when human hand touches the metal chassis.

Figure 17:
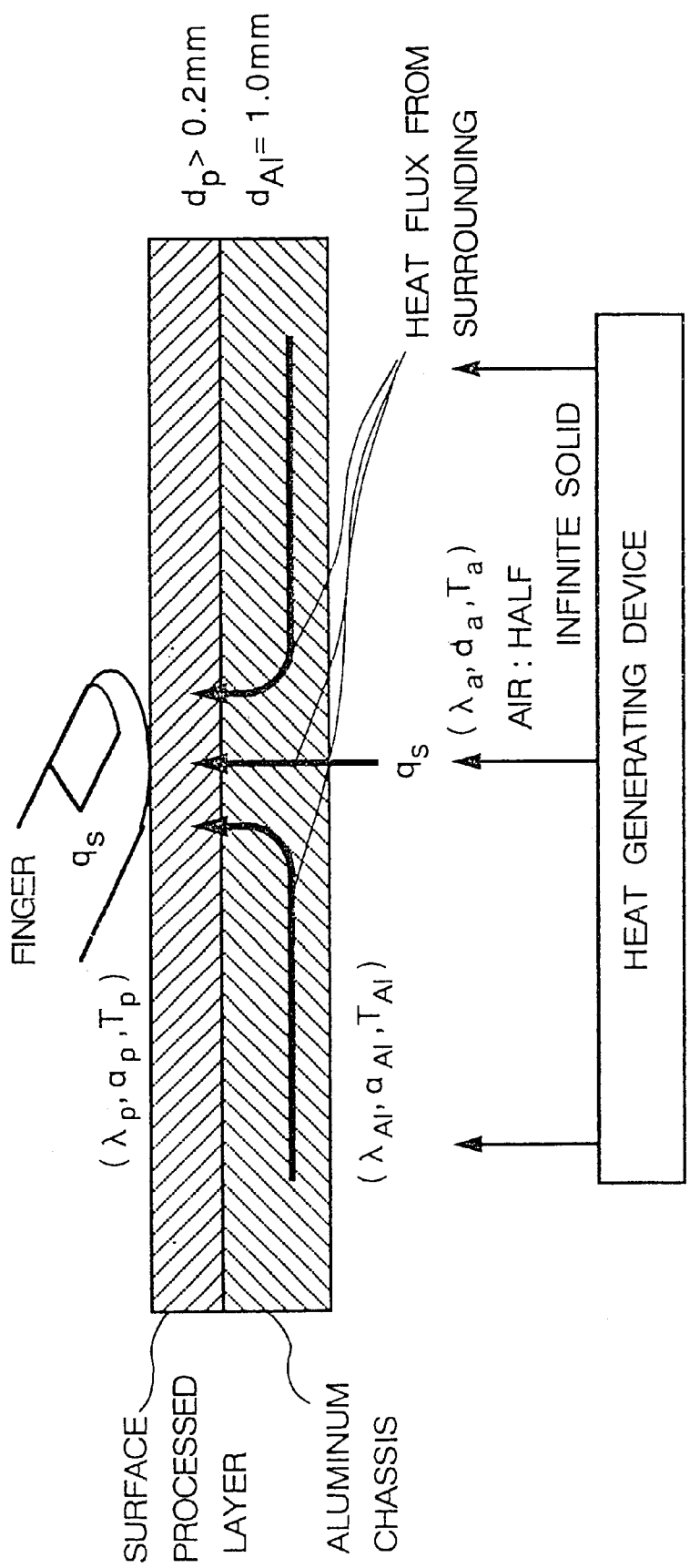
FIG. 17 outlines a heat flow upon contact with a finger.

Whereas in FIG. 17, $\lambda_p$: thermal conductivity of film (W/(mK))
$\lambda_{A1}$: thermal conductivity of aluminum (W/(mK))
$\lambda_a$: thermal conductivity of air (W/(mK))
$\alpha_p$: thermal diffusivity of film (m$^2$/S)
$\alpha_{A1}$: thermal diffusivity of aluminum (m$^2$/S)
$\alpha_a$: thermal diffusivity of air (m$^2$/S)
$T_p$: temperature of film (surface processed layer) (K)
$T_{A1}$: temperature of aluminum chassis (K)
$T_a$: temperature of air (K)
$d_p$: thickness of film
$d_{A1}$: thickness of aluminum chassis
$q_s$: amount of heat flux The temperature will decrease at portion of the aluminum chassis where the hand has touched, so heat is supplied broadly from the surrounding in a horizontal direction. However, the thermal conductivity for the paint is lower than the thermal conductivity for the aluminum chassis by about 1/1000 of the thermal conductivity of the aluminum chassis. Therefore, the amount of heat supply of the paint from the horizontal direction is small. Thus, an effect of heat flow in a perpendicular direction shown in FIG. 17 using thick arrows is considered to be dominant paths taken by the heat flowing to the hand. An evaluation for the amount of heat flow to the hand in one dimensional perpendicular direction is calculated using the heat transfer rate U as the index.

$$U = \lambda_p / d_p \quad (4)$$

Based on this assumption, the heat transfer rate (a parameter indicating a readiness of heat flow) perpendicular to the surface processed substrate in the one dimensional model is calculated as below.

First of all, for a purpose of comparison, the heat transfer rate for a case of normal coating process without using the foaming material 10 is calculated. The thermal conductivity $\lambda_{p1}$ for the paint used in the normal coating is considered to have the same thermal conductivity as epoxy and acrylic resins, which is 0.15 (W/mK). Provided that the thickness of film $d_{p1}$ is 40 μm, the heat transfer rate will be 3750(W/m²K) as shown in the equation of below.

$$\begin{aligned}U_1 &= \lambda_{p1}/d_{p1}\\ &= 0.15/40 \times 10^{-6}\\ &= 3750 \text{ W/m}^2\text{K}\end{aligned}$$

Next, the heat transfer rate for a case of coating using the foaming material 10 is calculated.

An effective thermal conductivity $\lambda_{p2}$ for the foamed layer is assumed to be a mixed presence of two coefficients of conductivity of the paint ($\lambda_{p1}$=0.15 W/mK) and the gas ($\lambda_a$=0.025 W/mK) by 50% each. The combined thermal conductivity is assumed, by inversely calculating from a parallel heat resistance, to be 0.088 W/mK. The thickness of film $d_{p2}$ is assumed to be 200 μm. The heat transfer rate is 440 W/m²K which is obtained from the calculation result of the equation below.

$$\begin{aligned}U_2 &= \lambda_{p2}/d_{p2}\\ &= 0.088/200 \times 10^{-6}\\ &= 440 \text{ W/m}^2\text{K}\end{aligned}$$

The results are indicating the following effects. As the first, the combined thermal conductivity is decreased by a presence of numerous number of small gaseous entrapments that will be contained in the normal coating. As the second, thickness of film is increased by a presence of the foamed layer. Compared to the thermal conductivity for the case of normal coating, the thermal conductivity of the layer for the case of using the foaming material is lower by about 1/10 of the normal coating. This effect of decreasing the amount of heat flow from the aluminum chassis to the hand appears as a difference in characteristics for both cases of the normal coating and the coating using the foaming material. Looking from a side of the hand, the heat transfer rate between the finger and the aluminum surface is the dominant heat transmitting parameter. However, with the presence of the foamed layer, the amount of heat flow the hand is eased by controlling the heat transfer rate by the foaming layer.

Embodiment 5.

Figure 7:
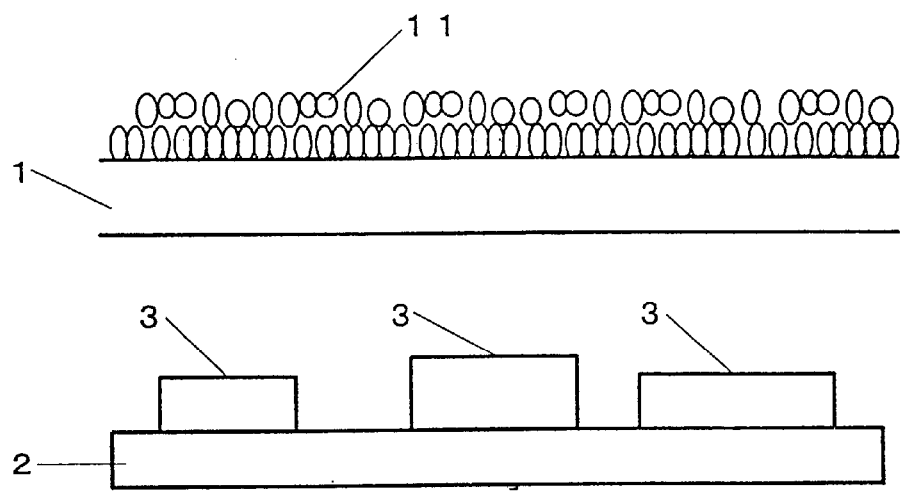
FIG. 7 is a cross-sectional view of embodiment 5 of the invention.

FIG. 7 shows an embodiment with repeatedly applied layers of bead-containing paint 11, increasing the layer thickness, and incorporated a porous structure with a large amount of gas incorporated in the film layers. This structure has the same effect as in embodiment 4. Instead of the bead-containing paint 11, a bead-containing resinous coating material and multiple-layered glass are similarly used.

Embodiment 6.

Figure 8:
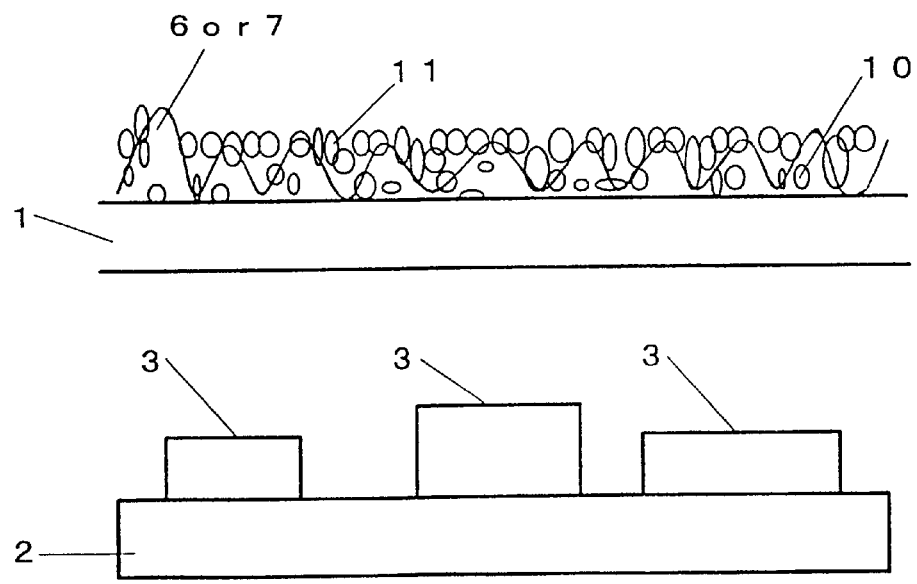
FIG. 8 is a cross-sectional view of embodiment 6 of the invention.

FIG. 8 is the example that combines embodiment 4 and embodiment 5.

In this embodiment, a decline in the restoring strength of the foaming material 10 is supplemented by the top coating with the bead-containing paint 11 because this can increase a hardness at the film surface. Foamed layer is prone to damage due to formations of porous structure and gas layers inside. Such surface of the foamed layer is top coated using a paint with high degree of hardness so that the strength of the film is intensified.

A large difference between the conventional paint and the bead-containing paint is the way in which a pigment component is blended in the paint.

The pigment is dispersed inside the conventional paint as it is. On the other hand, a large amount of "pigment enclosed using special resin to form minute bead-containing paint" or in other words, "pigmented beads" are contained in the bead-containing paint. These beads can give various colors to the paint.

The scope of application is large for a well-balanced combination of the pigmented beads having varied radius. For instance, a suede-like film needs raised nap and knobby feeling. In addition to a velvet or back skin and melange-like film that need a minor knobby feels, there is also a paint containing grounded natural collagen fibers with a flat painted surface.

Such processing methods in previously described embodiments are individually effective as well as in combinations, in accordance with various objectives.

Following are examples of combinations, in order, from top to bottom layers.

(1) paint 6 of type number one
    paint 6 of type number two (same or different from paint type number one)
    metal chassis plate 1

(2) resinous coating material 7 of type number one
    resinous coating material 7 of type number two (same or different from resinous coating material of type number one)
    metal chassis plate 1

(3) paint 6 (or paint 6 mixed with insulating filler material 8, granulated insulating material 9, or foaming material 10)
    resinous coating material 7 (or resinous coating material 7 that is mixed with heat insulating filler material 8, powdery insulating material 9 or foaming material 10)
    paint 6 (or paint 6 that is mixed with insulating filler material 8 or granulated insulating material 9 or foaming material 10)
    metal chassis plate 1

(4) resinous coating material 7 (or resinous coating material 7 that is mixed with insulating filler material 8 or granulated insulating material 9 or foaming material 10)
    paint 6 (or paint 6 that is mixed with insulating filler material 8 or granulated insulating material 9 or foaming material 10)
    resinous coating material 7 (or resinous coating material 7 that is mixed with insulating filler material 8 or granulated insulating material 9 or foaming material 10)
    metal chassis plate 1

(5) bead-containing paint 11
   resinous coating material 7 that is mixed with insulating filler material 8, granulated insulating material 9, or foaming material 10)
   paint 6
   metal chassis plate 1,
(6) resinous coating material 7 that is mixed with insulating filler material 8, granulated insulating material 9 or foaming material 10)
   bead-containing paint 11
   paint 6
   bead-containing paint 11
   metal chassis plate 1
(7) paint 6
   bead-containing paint 11
   metal chassis plate 1
(8) resinous coating material 7
   bead-containing paint 11
   metal chassis plate 1
   Various other combinations are also possible.

Using any of the processing methods mentioned previously, the hand contact area will be reduced by intentionally incorporating the rough surface, and reducing the thermal conductivity to the hand, so that excessive rise in touching warmth is prevented.

Embodiment 7.

Figure 9:
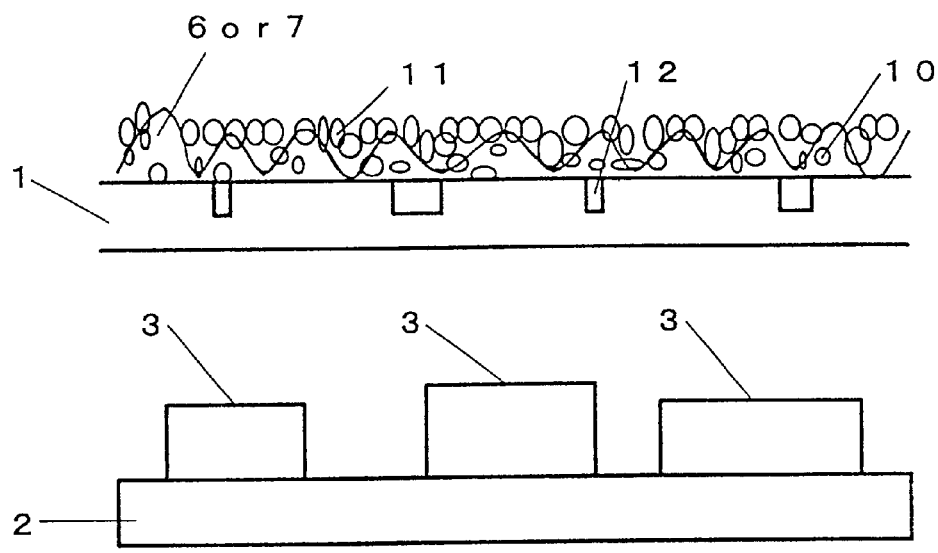
FIG. 9 is a cross-sectional view of embodiment 7 of the invention.
Figure 10:
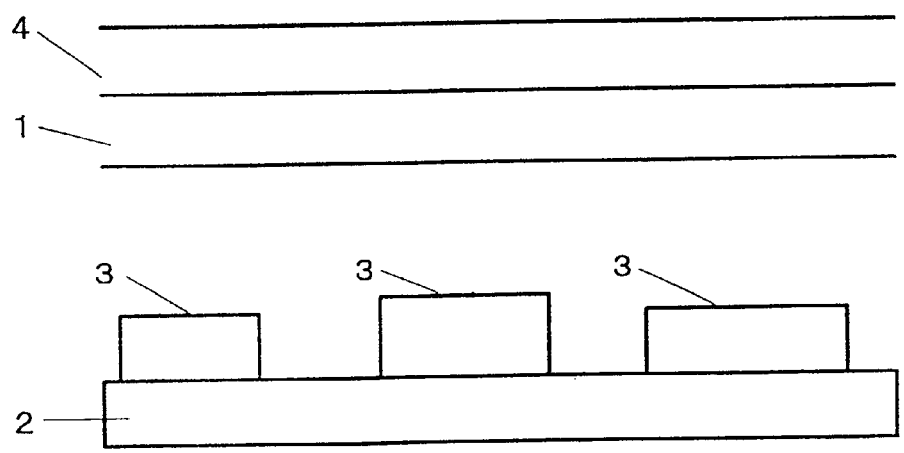
FIG. 10 is a cross-sectional view of related art 1.
Figure 11:
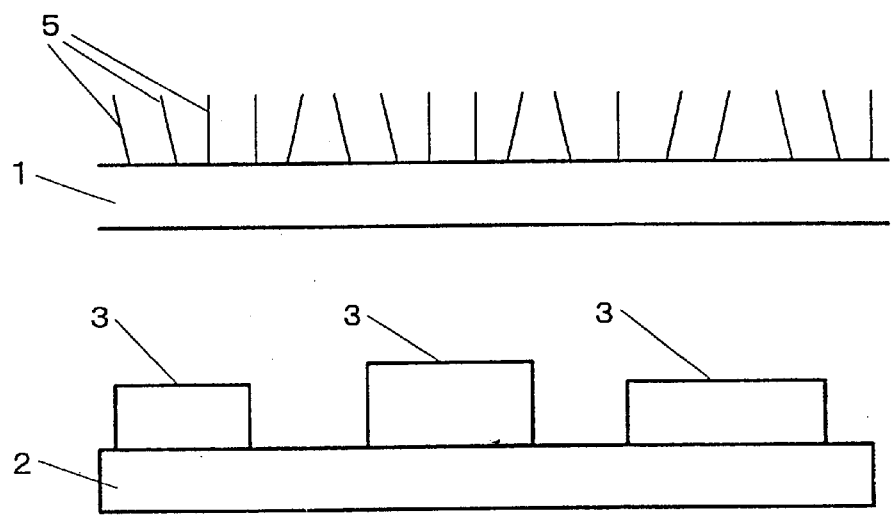
FIG. 11 is a cross-sectional view of related art 2.
Figure 12:
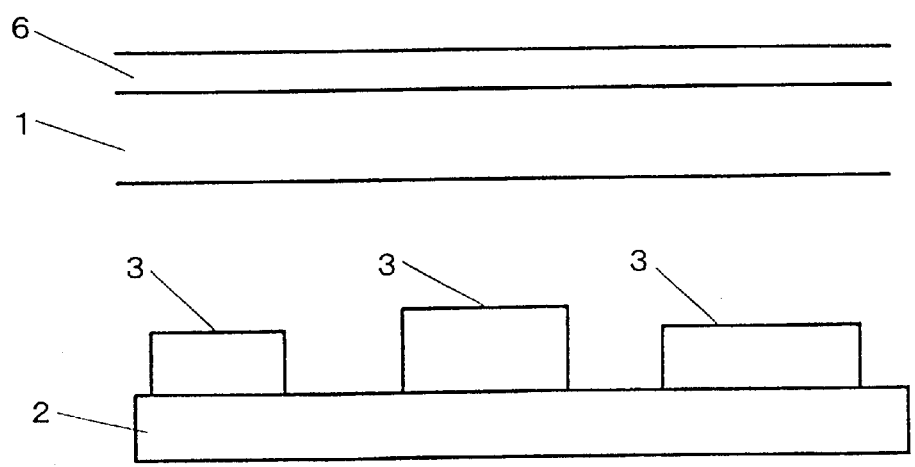
FIG. 12 is a cross-sectional view of related art 3.

FIG. 9 shows an embodiment that appropriately combines the surface processing methods mentioned from embodiments 1 to 6, as well as aiming to fill a dent, wrinkle or scar at a surface formed during molding in die-casting. In the die-casting of metal chassis made of magnesium or aluminum, small dents or wrinkles 12 occur on its surface at an ejection stage, and repairs are generally made by puttying. A dent on the surface is a detriment that occurs during casting. A surface wrinkle is formed during casting when molten metal flows into a void casting frame. In practice, the thick layer coating as shown in the embodiments 1 to 6 has a filling effect and conceals dents or wrinkles 12. Thus, for those small detriments, there is no requirement to repairs with puttying, thereby reducing costs, decreasing the number of processing steps, and improving quality.

Generally, for electronic devices, the metal chassis plate 1 becomes hot due to a heat generated from the heating device 3. By applying paint and resinous coating material in multiple layers, or by applying paint and/or resinous coating material that are mixed with a high proportion of insulating material, the insulating layer structure is incorporated in the film layer. Also, the mixing of insulating material is effective in reducing the amount of heat flow to a hand. Also, mixing of the foaming material to form a foamed structure can create a rough structure at the surface of film which can reduce the touching warmth and be effective in reducing the amount of heat flow to a hand. Also for a metal chassis that became too hot, painting the paint or resinous coating material including the insulating material and gaseous entrapments can lower the thermal conductivity, so, the touching warmth reduction is improved significantly. Also, by intentionally forming a rough surface on a substrate, the contact area upon handling is reduced, effectively lowering the thermal conductivity to a hand. That is, the amount of heat flow to a hand is reduced by reducing the heat flow from the moment of handling the metal as well as afterward, reducing the touching warmth.

The surface processing is done on various portions: throughout the external cover; to a part subjected to a change in temperature (e.g., the elliptical region of FIG. 1); and to a part where there is a possibility of handling.

Result of experiment for the foamed paint coating illustrated in FIG. 8 is described below.

Experimental Study 1 (evaluation for property of increasing temperature)

Figure 13:
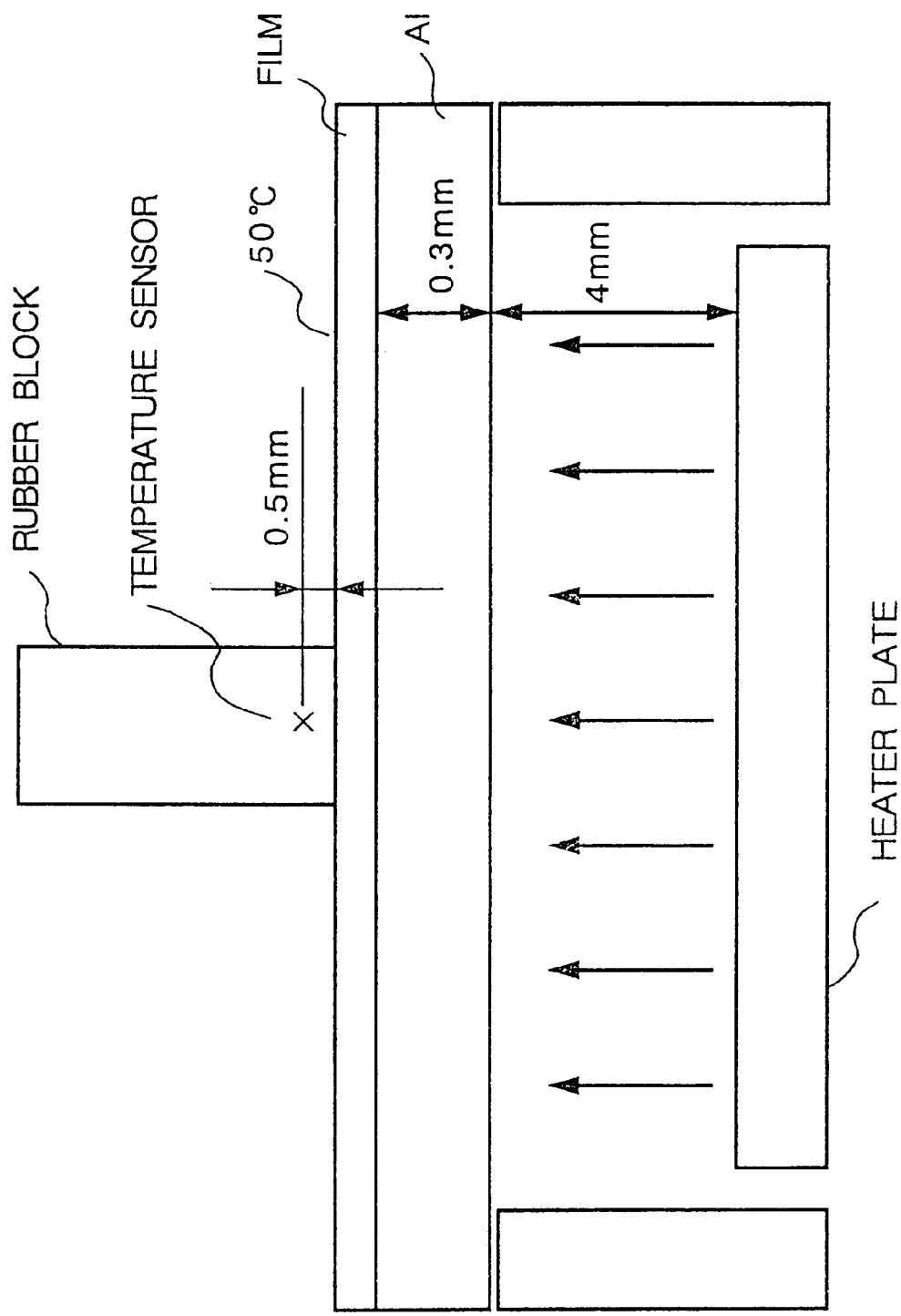
FIG. 13 illustrates apparatus for an experimental study of the invention.

The property of increasing temperature is measured by touching with a rubber block as dummy hand is shown in FIG. 13. The temperature sensor is placed in a depth of 0.5 mm inside the rubber hand. The sample A is an aluminum plate sized 105×150×0.3 mm as a base with the normal epoxy coating. The sample B is the aluminum plate sized 105×150×0.3 mm as the base with the foamed paint coating illustrated in FIG. 8 of the present invention. The samples are heated using heaters located 4 mm below, with a fixed surface temperature of 50° C.

Figure 14:
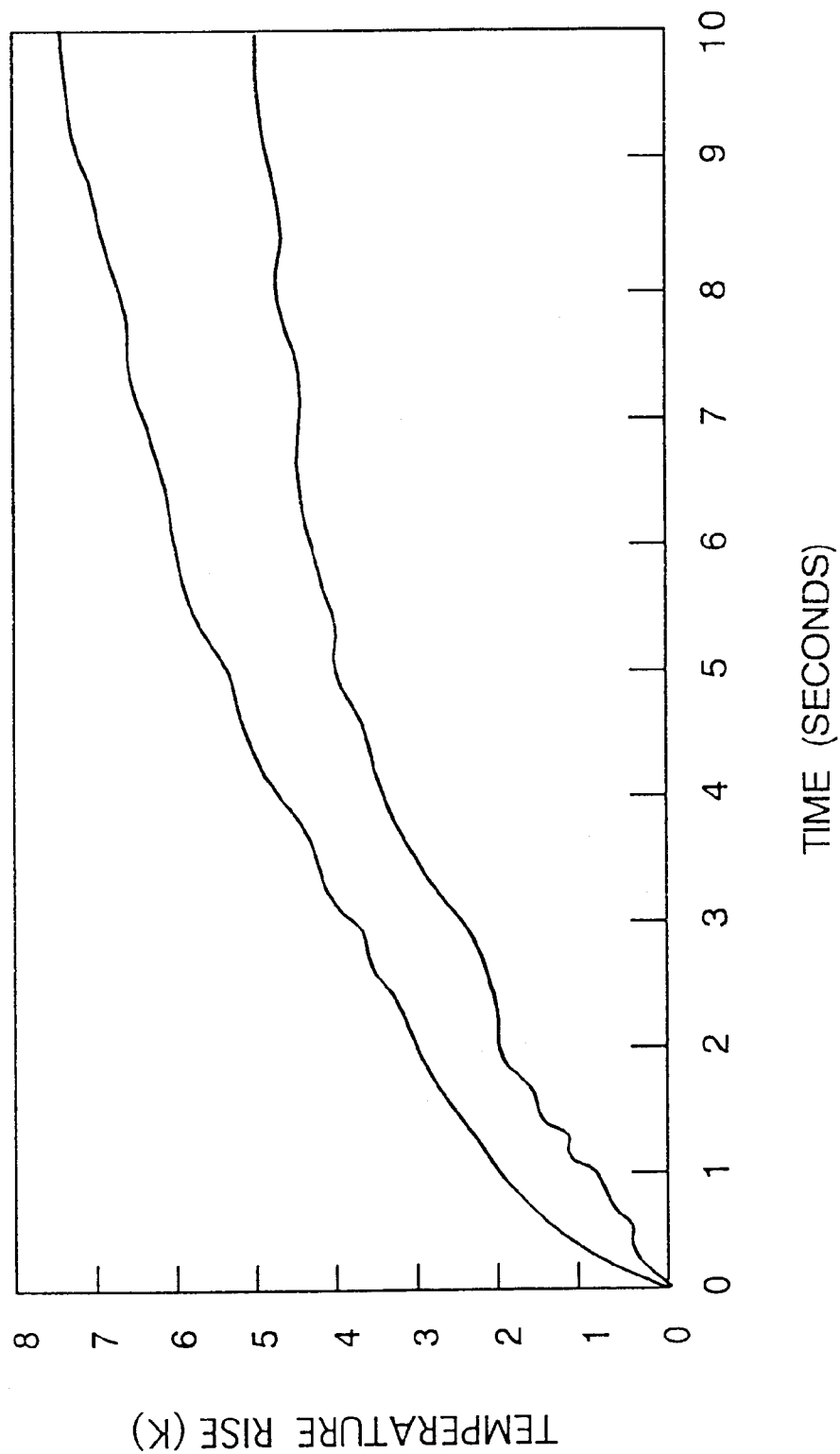
FIG. 14 illustrates a result of the experimental study of the invention.

The result of experiment is shown in FIG. 14, and it is recognized that a profile of increase in the touching warmth for the foamed paint coating is lower compared to a profile for the normal epoxy coating.

Experimental Study 2 (vote test of touching warmth level)

Touching warmth upon touching the samples are evaluated based on votes by 9 human testers.

As FIG. 15 shows, a sample C is further added for comparison besides samples A and B. The sample C is the ABS resinous plate with normal coating. The samples are heated using the same heating device as in the experimental study 1, and maintained the surface temperature of 46° C., in the room temperature of 25° C.

The count up result of the response of testers touching the three samples are obtained, and is shown in FIG. 16. The testers reported the order and level of touching warmth of the samples. Clearly, all testers wave answered the sample A to be the hottest of all three samples (A>>B, A>>C). The touching warmth for the sample B was recognized to be substantially lower than the sample A, and the temperature of sample B was sensed to be close to the temperature of sample C. The touching warmth for the sample B and the sample C were difficult to distinguish, and reported order of touching warmth varied (B>C, C>B, B=C).

The effects of the invention are listed below.

Comparing to the conventional method of dealing with increased heat at surface such as pasting of the insulating material and the pile transplanting, the processing for the present invention is easy and can be implemented on top of the existing conventional methods. For these reasons, the productivity increases and the cost is reduced.

By adopting the present processing method, the problem with the touching warmth, which is the one of the problems upon using a metal chassis, is eased, and possible applications for the metal chassis increases. Accompanying with this, mobile electronic devices having small-sized, lightweight and strong chassis structure is implemented.

In addition, when the rough surface is implemented, a smooth touch of coated surface which is a characteristic of a metallic surface is, removed. The rough surface has a merit upon designing and appearance.

Further, the thick layer coating has the filling effect and conceals dents or wrinkles, thus there is no requirement to repair such detriments of small extent with putty, reducing costs, decreasing the number of production steps, and improving quality.

Furthermore, the formation of a porous film on the surface of a chassis can increase the strength against vibration and shock. Also, noise prevention can be achieved from the effects of absorbing noise and sound insulation.

The application of invention is not limited to a metal chassis, but can also be applied to other materials with high thermal conductivity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A portable electrical apparatus comprising:
   an electrical device generating heat in operation;
   a metal case conducting the heat generated by the electrical device, having an external surface, and containing the electrical device; and
   a film on the external surface including an insulating filler providing thermal insulation from the electrical device.

2. The apparatus according to claim 1 wherein the film includes a resin.

3. The apparatus according to claim 1 wherein the metal case is selected from the group consisting of aluminum, magnesium, aluminum alloys, and magnesium alloys.

4. The apparatus according to claim 1 wherein the metal case is die cast and the film fills imperfections in the external surface of the die cast metal case.

5. The apparatus according to claim 1 wherein the film has a rough surface.

6. The apparatus according to claim 1 wherein the film is formed by applying a paint containing the insulating filler to the external surface of the case.

7. The apparatus according to claim 1 wherein the electrical apparatus is a portable computer and the device generating heat is an integrated circuit.

* * * * *